United States Patent
Noldus

(10) Patent No.: US 7,130,650 B2
(45) Date of Patent: Oct. 31, 2006

(54) DELIVERING MESSAGES IN A TELECOMMUNICATIONS NETWORK

(75) Inventor: Rogier August Caspar Joseph Noldus, ML Tilburg (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 143 days.

(21) Appl. No.: 10/499,630

(22) PCT Filed: Dec. 21, 2001

(86) PCT No.: PCT/EP01/15384

§ 371 (c)(1),
(2), (4) Date: Jun. 21, 2004

(87) PCT Pub. No.: WO03/055240

PCT Pub. Date: Jul. 3, 2003

(65) Prior Publication Data

US 2005/0085219 A1    Apr. 21, 2005

(51) Int. Cl.
*H04Q 7/20* (2006.01)
*H04M 3/42* (2006.01)

(52) U.S. Cl. .................. 455/466; 455/414.1; 370/259

(58) Field of Classification Search .................. 455/466
See application file for complete search history.

(56) References Cited

U.S. PATENT DOCUMENTS

| | | | |
|---|---|---|---|
| 5,666,652 A * | 9/1997 | Lin et al. .................. 455/435.1 |
| 5,854,975 A * | 12/1998 | Fougnies et al. ........... 455/408 |
| 5,987,323 A | 11/1999 | Huotari |
| 6,496,690 B1 * | 12/2002 | Cobo et al. .................. 455/408 |
| 2001/0041579 A1 | 11/2001 | Dewey et al. |
| 2002/0119794 A1 * | 8/2002 | Byers et al. ................. 455/466 |
| 2003/0147363 A1 * | 8/2003 | Ala-Luukko ................ 370/328 |

OTHER PUBLICATIONS

European Patent Office, International Search Report for PCT/EP01/15384.

* cited by examiner

*Primary Examiner*—Fan Tsang
*Assistant Examiner*—Hemant Patel

(57) ABSTRACT

This invention relates to a flexible rate matching method, comprising the steps of: a) receiving a continuous stream of data items at a prespecified rate of a clock signal in a configurable data shift register; b) storing, for each data item stored in the data shift register, an associated indication of validity in a configurable validity shift register and shifting the indications of validity at said prespecified rate; c) modifying the contents of the data shift register and the validity shift register through puncture/repetition operations so as to achieve a rate matching, and d) outputting valid data items at said prespecified rate using said indications of validity stored in the validity shift register. The invention also relates to a corresponding flexible rate matching apparatus as well as to a computer program product and a processor program product.

14 Claims, 3 Drawing Sheets

DELIVERING MESSAGES IN A TELECOMMUNICATIONS NETWORK

The invention relates to a telecommunications system, in particular a telecommunications system with mobile terminals, and a method of delivering messages in such a telecommunications system. The invention also relates to equipment for use in a telecommunications system.

More particularly the invention relates to a system comprising queuing equipment for queuing messages that could not be delivered;

a plurality service points, each for signaling whether a respective reason for not delivering the message is asserted;

switching equipment arranged to consult the service points to determine whether at least one of the reasons has been asserted and if so to queue the message in the queuing equipment instead of delivering the message, the queuing equipment being arranged to initiate a retry of the message from the queue upon receiving a trigger signal from at least one of the service points.

SMS (Short Message Service) messages are a typical example of messages that can be delivered by a telecommunications system to terminal equipment such as mobile terminals. Such messages need not be delivered in real time. For various reasons it may be necessary to defer delivery of such a message to the terminal equipment. This may be the case for example when the terminal equipment is switched off, when the terminal equipment has no memory space for storing the message (for example on the SIM card (Subscriber Identity Module)), or when the subscriber has insufficient credit to pay for receiving the message (for example for a pre-paid subscriber).

In known third generation mobile telecommunications systems, such as described in standardization document 3GPP TS 23078 for example, different service points administer information on which decisions can be based whether the message can be delivered. A service point that contains the HLR (Home Location Register) of the terminal equipment stores information about the switched oil/off status of the equipment and about the availability of memory space on the SIM for receiving messages. Another service point, the SDP or Service Data Point, maintains information about subscriber credit.

When an SMS message arrives an SMSC/SMS-GMSC combination contacts the HLR and forwards message to an MSC or SGSN, which in turn contacts the SDP (These conventional abbreviations have the following meaning: SMSC/SMS-GMSC=Short Message Service Centre/SMS Gateway Mobile Services Switching Centre (functionally the SMSC and the SMS-GMSC are separate units in a telecommunications network, the SMSC managing the SMS messages, the GMSC managing routing of the messages, but usually the two functions are combined in one physical piece of equipment) MSC=Mobile services Switching Centre and SGSN=Serving GPRS Service Node). The reason for non-delivery may come from the HLR (first interrogation), the MSC or SGSN (e.g. phone switched off or SIM card full) or SDP/SCP combination (insufficient credit).

The service point that contains the HLR plays a central role in the network, because it keeps track of information relevant to the question whether the terminal equipment can be reached at all and whether there is memory space on the SIM for receiving messages. When a message cannot be delivered because the terminal equipment cannot be reached, the service point that contains the HLR is set to a state to make it notify the applicable queue when the terminal equipment becomes available again for receiving messages. Upon notification to the equipment initially receiving the message, delivery of the message is retried, provided that there are no other reasons for deferring delivery of the queued messages. If the reason for not delivering the message was unavailability of the terminal equipment, then such a retry will almost always result in success.

The mechanism that is used to control the retries impacts the use of network signaling resources such as transmission capacity and the use of storage space in the telecommunications system. Long periods between retries potentially cause needless delay before a message is delivered, thereby occupying storage space. Long periods between retries may also result in expire of the validity period of the stored message; the result will be that those messages are not delivered at all. Frequent retries can reduce the delay, but frequent retries consume more network signaling resources, which are no longer available for other purposes. This leads to a problem in the case of messages that could not be delivered due to insufficient credit.

Amongst others, it is an object of the invention to provide a telecommunications system and a method of operating a telecommunications system that allows for efficient use of signaling resources and/or storage space when delivery of messages has to be deferred.

The invention provides a telecommunications system that is characterized in that the queuing equipment is arranged to maintain a plurality of logical queues, each for queuing messages that could not be delivered for a different one of the reasons or combination of the reasons, each of the service points supporting a state in which the service point sends a trigger signal to the queuing equipment upon deassertion of the respective one of the reasons signalled by that service point, the queuing equipment being arranged to set each service point that signalled that its reason was asserted to said state, to select one of the queues dependent on the asserted reason and to move the message into the selected one of the queues if the reason was asserted, the queuing equipment being arranged to initiate a retry of delivery of one or more messages from each particular queue upon receiving the trigger signal corresponding to deassertion of the reason or reasons of that particular queue.

By differentiating the logical queues according to the possible reasons for non-delivery of messages, it is made possible to retry only those messages for which the reason for non-delivery has been removed. Thus, switching equipment that performs the retries can avoid retries that are expected to be unsuccessful. (Herein the term "switching equipment" may refer to a single unit such as for example an SMSC/SMS-GMSC combination in a third generation network, or an MSC, or an SGSN, or a combination of such units).

Without deviating from the invention, the logical queues may be implemented in various ways: separate physical memories may be used for different queues, or messages from different queues may be stored in different regions of the same physical memory. A single physical queue may even be used, which is differentiated into different logical queues by distinguishing attributes associated with the messages in the queue, so that the messages can be treated differently in accordance with the logical queue to which they belong.

Retries of message delivery from different queues are triggered by trigger signals from different service points, each in accordance with the reason for non-delivery of messages of the relevant queue. Thus, retry of delivery of messages of each queue is triggered by removal of the reason, or combination of reasons, for which the messages in the queue could not be delivered. As a result, no needless retries will consume signaling resources and the message will not occupy storage space longer than necessary.

In an embodiment of the system in accordance with the invention, one of the reasons of delivery failure is availability of insufficient credit to charge for delivering the message, a first one of the service points maintaining information about the credit remaining for delivery to the terminal equipment, the first one of the service points being arranged to send the trigger signal when in said state when the credit is replenished, a first one of the queues being specific to messages that were not delivered due to insufficient credit. Thus, messages that could not be delivered because of insufficient credit, for example of a pre-paid subscriber, can be kept out of other queues of messages that may be retried even when no credit has been added (for example messages that are delivered at the expense of the sender or messages that are delivered for free).

In another embodiment of the system in accordance with the invention, a further one of the reasons is unavailability of the terminal equipment in the system, a further one of the queues being specific to messages that were not delivered due to unavailability of the terminal equipment, the queuing equipment being arranged to move a content of the first one of the queues to the second one of the queues upon reception of the trigger signal from the first one of the service points when the second one of the queues is not empty upon reception of the trigger signal. Thus it is avoided that delivery of the messages that are in the queue of messages that have not been delivered for lack of credit is retried when the terminal equipment is not available.

In a mobile network messages for mobile user equipment are preferably queued at a common location. In this way management of retries requires a minimum of overhead. Preferably the equipment at the common location sends status messages to service points that manage the reasons for not delivering the message, to instruct these service points to send a trigger signal when a reason for not delivering the message has been removed. Thus a minimum number of retries will be needed to deliver the message. Also preferably the service points are the same points that are used to determine whether the message could be delivered in the first place.

In another embodiment of the system in accordance with the invention, input equipment for receiving the message, the input equipment being arranged to test whether any one of the queues in which the message may be placed in the case of delivery failure, is not empty, and if so to place the message into that one of the queues, and if not to forward the message to the switching equipment for delivery. Thus an attempted delivery is avoided if it appears from the non-emptiness of one of the queues that the message cannot be delivered successfully. Similarly a retry may be avoided from one queue if non-emptiness of another queue indicates that the message cannot be delivered successfully.

These and other objects and advantageous aspects of the system and method in accordance with the invention are described in more detail using the following figures.

Figure 1:
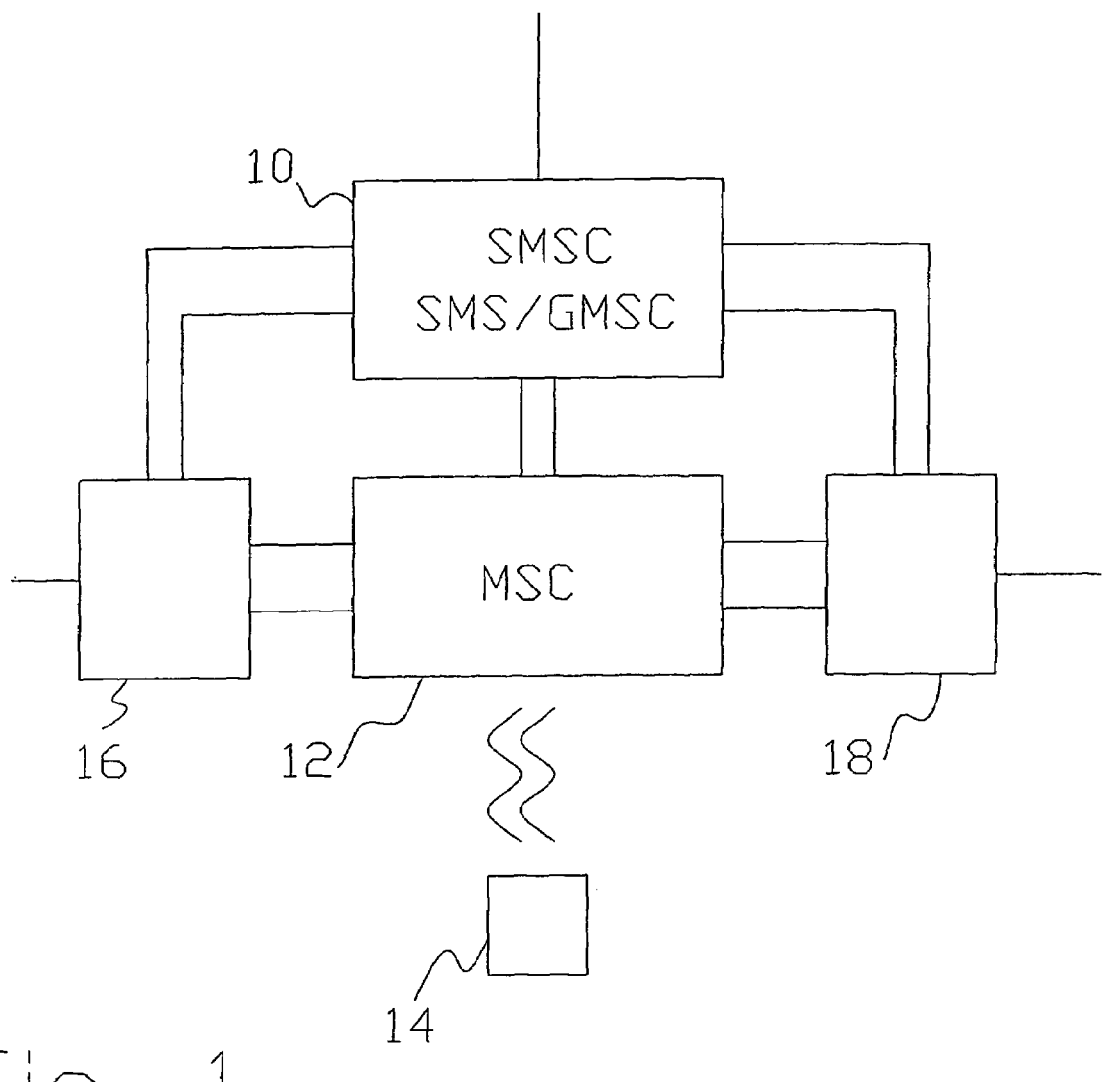
FIG. 1 shows part of a telecommunications system

FIG. 1 shows part of a telecommunications system. The system contains message source equipment 10, switching equipment 12, terminal equipment 14, and service points 16, 18. By way of example, a telecommunications system is described in which the terminal equipment 14 is a mobile station. In this example the source equipment 10 is an SMSC/SMS-GMSC apparatus (Short Message Service Centre (SMSC)/SMS Gateway Mobile services Switching Centre (SMS-GMSC) combination) with an input for receiving SMS messages that shall be delivered to mobile station 14 in the system, and an output coupled, via the telecommunications network, to switching equipment 12 (an MSC: Mobile services Switching Centre or an SGSN: Serving GPRS Service Node) which in turn serves the mobile station 14. Service points 16, 18 are coupled to the source equipment 10 and the switching equipment 12 and are for example an apparatus containing the HLR of the mobile station 14 and a Service Data base for the mobile station 14. The Service Data base may be a combination of a Service Control Point (SCP) and Service Data Point (SDP).

Although the terminology of third generation telecommunications systems will be followed, it shall be clear that the invention is not limited to such systems. For example, the invention may be applied to second-generation telecommunication systems and or GPRS networks as well.

In operation, SMS messages are submitted to the source equipment 10 for delivery to the mobile station 14. Each SMS message specifies the mobile station 14 for which it is intended. The source equipment 10 derives from mobile station 14 which HLR shall be contacted to obtain the present location of mobile station 14. Source equipment 10 consults the HLR for the; current location of the specified mobile station 14. Subsequently source equipment 10 forwards the SMS message to the switching equipment 12 that is currently able to deliver the SMS message to the mobile station 14. Switching equipment 12 consults service point 18 to determine whether delivery of the SMS message to mobile station 14 is allowed.

For this purpose, service point 18 contains a database with entries for a group of mobile stations 14, the entries specifying for example the service level to which the subscriber of the mobile station 14 is entitled and, in the case of a pre-paid subscription, the amount of credit left for the subscriber. When queried by the switching equipment 12, service point 18 retrieves the entry for the mobile station for which the SMS message is intended and determines whether the service level supports delivery of the SMS message, and, in the case that the subscriber has a pre-paid subscription and delivery of this SMS has to be paid for, whether the subscriber has sufficient credit. The service point 18 returns the result of this query to the switching equipment 12 in the form of a release instruction.

If the release instruction indicates that delivery of the SMS message is allowed, then switching equipment 12 attempts to deliver the SMS message to mobile station 14. If the delivery fails, then switching equipment 12 forwards the release instruction to source equipment 10, indicating that the SMS message could not be delivered.

Figure 2:
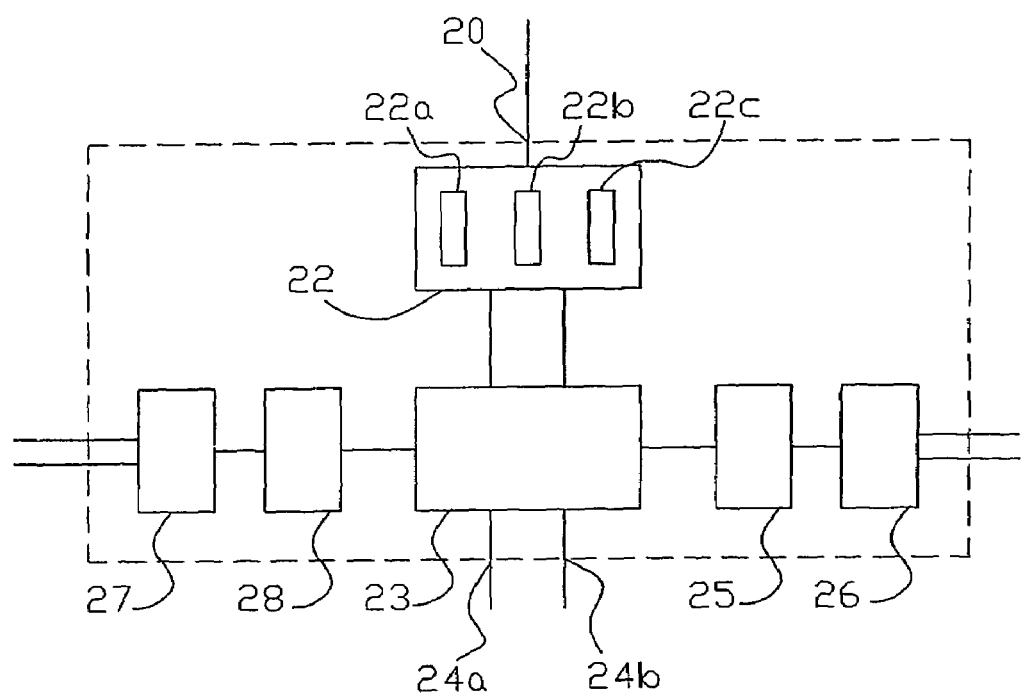
FIG. 2 shows functional elements of a SMSC/SMS-GMSC combination

FIG. 2 shows functional elements of source equipment 10. The figure shows an input 20, queue memory 22 with individual queues 22a–c, SMS message transmitter 23, output and input 24a,b, status message generator 25, status message transmitter 26, trigger signal receiver 27 and queue selector 28. The input 20 is coupled to queue memory 22, which has an output coupled to SMS message transmitter 23. SMS message transmitter 23 has an output coupled to output 24a and an input coupled to input 24b. SMS message transmitter 23 has a further output coupled to status message generator 25 which has an output coupled to status message transmitter 26. Trigger signal receiver 27 has an output coupled to queue selector 28, which in turn has an output coupled to SMS message transmitter 23.

In operation, SMS messages received at input 20 are supplied to SMS message transmitter 23, which forwards the SMS messages to switching equipment 12 (not shown) and receives back a release instruction from the switching equipment 12 (in addition or prior to supplying, the message may be buffered in one of the queues 22a–c that serves for buffering incoming messages prior to delivery). If the release instruction indicates that the SMS message could not be delivered to the destined mobile station 14, then SMS message transmitter 23 reads the reason for not delivering the SMS message from the release instruction. The SMS message transmitter 23 selects one of the queues 22a–c in accordance with the reason, for example one queue 22a if the SMS message could not be delivered because the mobile station 14 was not present in the telecommunications system and another queue 22b if the SMS message could not be delivered because the mobile station is operated under a prepaid subscription and there was insufficient credit to deliver the SMS message. SMS message transmitter 23 instructs queue memory 22 to put the SMS message in the selected one of the queues 22a–c.

Optionally validity periods may be specified for each message, to indicate after how much time the message may be discarded. If the duration of the validity period of one of the messages is zero and that message could not be delivered to the mobile station 14 then the message may be discarded without placing it in one of the queues 22a–c first.

If the SMS message was buffered in an incoming queue 22a–c, then SMS message transmitter 23 may simply remove the message from this queue if release instruction indicates that the SMS message was delivered, or move it to the relevant other queue if the SMS message was not delivered.

In principle an incoming SMS messages may even be moved to one of the queues 22a–c without even attempting to deliver the SMS message. If one of the queues 22a–c is not empty, and the SMS message is of a type that: could be placed in that queue, then the SMS message may be placed in that queue immediately, without first forwarding the SMS message to the switching equipment 12. In this case, the source equipment 10 can determine internally whether the delivery is likely to be successful, and it can refrain from an attempt at delivery if the attempt is not likely to be successful. This is the case for example if the SMS message is one for which credit is needed to deliver the SMS message if the queue of SMS messages for which there was insufficient credit to deliver the SMS messages is not empty.

Putting the SMS message into a specific one of the queues 22a–c can be implemented in many ways. In one embodiment of the system in accordance with the invention, multiple memories are used, one for each queue 22a–c and the SMS message is written into the relevant memory. In another embodiment of the system in accordance with the invention, the SMS message is stored in a common memory immediately when it is received and information is added later to indicate that the stored SMS message belongs to a specific queue when information is received that the SMS message could not be delivered.

When SMS message transmitter 23 places an SMS message into a queue 22a–c, SMS message transmitter 23 also issues an instruction to status message generator 25 to generate a status message for the service point 16, 18 that maintains relevant information about the reason for which the SMS message could not be delivered. Of course, a status message may be sent for every undelivered message, but preferably status message generator 25 needs to be instructed to generate the status message only when the queue in which the SMS message has been placed was empty before the SMS message was placed into it.

Status message generator 25 is instructed for example to generate a status message for the service point 16 with the HLR when the SMS message could not be delivered because the mobile station 14 was not connected to the system or a status message for the service point 18 when the SMS message could not be delivered because of insufficient credit. The status message generator 25 generates the status message including an identification of the mobile station 14 to which the SMS message could not be delivered and an identification of the source equipment 10. Status message generator 25 causes status message transmitter 26 to transmit the status message to the relevant service point 16, 18.

Figure 3:
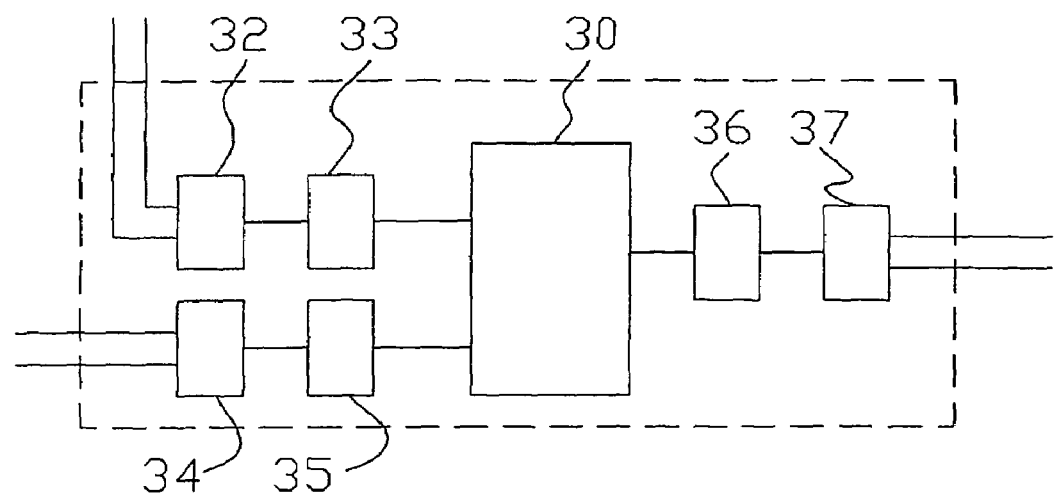
FIG. 3 shows functional elements of an SDP

FIG. 3 shows a service point for use as service point 16, 18 in the system of FIG. 1. The service point contains a database memory 30, a status message transceiver 32, a query transceiver 34 and an update transceiver 36. A status message processor 33, a query processor 35 and an update processor 37 are coupled between the database and status message transceiver 32, query transceiver 34 and update transceiver 36 respectively. Although the various transceivers and processors are shown as separate functional elements, they may in fact be implemented using a common transceiver and processor programmed to perform the functions of the various processors.

Query transceiver 34 receives queries from switching equipment 12, for example about whether sufficient credit is available for a mobile station 14. In response, query processor 35 consults a database in database memory 30 to determine whether there is sufficient credit and causes query transceiver 34 to send back a release instruction indicating whether there is sufficient credit.

The status message transceiver 32 in service point 16, 18 receives the status message from source equipment 10. In response, status message processor 33 sets an internal flag in the database in database memory 30 to indicate that the service point has assumed a state in which a trigger signal shall be sent to the source equipment 10 indicated in the status message that was used to set the flag, when information about the mobile station 14 in the service point 16, 18 is updated in a way that is relevant to delivery of the SMS message.

Each service point 16, 18 contains a database with information about mobile stations. When update transceiver 36 receives an instruction to update the information about a mobile station 14, for example an increase in the amount of credit for a pre-paid subscriber of a mobile station 14, update processor 37 updates this information in the database and checks whether the flag has been set for that mobile station 14. If so, update processor causes status message transceiver 32 to send back a trigger signal to the source equipment 10 indicated in the status message that was used to set the flag. The trigger signal indicates the mobile station 14 for which the information was updated, and the nature of the update, for example in the form of an identification of the service point 16, 18 that sends the trigger signal.

Trigger signal receiver 27 in source equipment 10 receives the trigger signal and passes it to queue selector 28. Queue selector 28 determines from the nature of the update whether and from which queue 22a–c for mobile station 14 delivery of SMS messages must be retried. If a retry is needed, queue selector 28 signals SMS message transmitter 23 to re-attempt delivery of the SMS messages from the selected queue 22a–c. For example, if the trigger signal is received from the service point 16 that contains the HLR, then delivery of SMS messages shall be retried from the queue that contains SMS messages that could not be delivered because of unavailability of the mobile station 14, or, if the trigger signal is received from the service point 18 that contains credit information, delivery of SMS messages shall be retried from the queue that contains SMS messages that could not be delivered because of lack of credit.

In principle, retries of delivery of SMS messages from different queues may be completely independent. In this case, SMS messages that could not be delivered for one reason may, upon retry, turn out to be undeliverable for another reason, leading them to be placed into another one of the queues 22a–c. Therefore, when source equipment 10 receives a trigger signal for one queue, it preferably checks whether any other queue in which the SMS message could be placed is not empty. If so, source equipment 10 places the SMS message in that queue without first forwarding the SMS message to the switching equipment 12. This is the case for example if the queue is one of SMS messages for which credit is needed to deliver the SMS message. If the queue of SMS messages for that could not be delivered because the mobile station 14 was not available is not empty, then the SMS messages are moved into that queue.

In an embodiment of the system in accordance with the invention, the service point 18 that sends trigger signals when the credit is updated also includes an indication of the amount of available credit in the trigger signal. In this case, source equipment 10 only forwards as many of the SMS messages as can be delivered from the amount of available credit from the queues 22a–c that contain messages for which credit is needed.

Furthermore, each message may contain an expire date, specified for example as a date or as a timer value to indicate the duration of the time interval from the present until the expire date. If the source equipment 10 detects that a message in a queue has an expire date in the past, then the message is removed from the queue. Thus, the risk of overflow of the queues is reduced. In the case of queue overflow, SMS messages may have to be discarded. Messages that have an expire timer value equal to 0 never need to be placed in a queue.

It will be appreciated that the embodiments of the system in accordance with the invention, shown in the figures, are merely used by way of example. Without deviating from the invention, other embodiments of the system in accordance with the invention may be used. As has been stated above, the queues may be physically separate queues or a common memory region with SMS messages that are logically organized into different queues for example by adding type information about the reason of non-delivery to the SMS messages, or by using different queues of pointers to undelivered SMS messages.

Also, SMS messages have been used by way of example, but the invention applies also to other types of messages whose delivery may need to be deferred and for which there can be more than one reason for temporarily not delivering the message to terminal equipment. Also, although the invention has been illustrated for a mobile telecommunications system, it will be appreciated that the invention applies to other systems, such as fixed telecommunications systems, but the invention is especially useful for mobile telecommunications systems because in these systems different reasons for not-delivering messages frequently occur.

Also, although an example has been shown with two queues, one for SMS messages that could not be delivered because the mobile station 14 was not present in the system and one for SMS messages that could not be delivered because of insufficient credit, more queues may be used for different reasons, also queues may be introduced for SMS messages that could not be delivered for combinations of reasons.

The invention claimed is:

1. A telecommunications system arranged for delivering a message to terminal equipment, the system comprising:
    queuing equipment for queuing messages that could not be delivered;
    a plurality of service points, each for signaling whether a respective reason for not delivering the message is asserted; and
    switching equipment arranged to consult the plurality of service points to determine whether at least one of the reasons has been asserted, and if so, to queue the message in the queuing equipment instead of delivering the message, the queuing equipment being arranged to initiate a retry of the message from the queue upon receiving a trigger signal from at least one of the service points,
    wherein the queuing equipment is arranged to maintain a plurality of logical queues corresponding to the reasons for not delivering the message, each for queuing messages that could not be delivered for a different one of the reasons or combination of the reasons,
    wherein each of the service points supports a state in which the service point sends a trigger signal to the queuing equipment upon deassertion of the respective one of the reasons signaled by that service point,
    wherein the queuing equipment is arranged to set to said state, each service point that signaled that its reason was asserted, to select one of the queues dependent on the asserted reason, and to move the message into the selected one of the queues if the reason was asserted,
    wherein the queuing equipment is arranged to initiate a retry of delivery of one or more messages from each particular queue upon receiving the trigger signal corresponding to deassertion of the reason or reasons corresponding to that particular queue.

2. The system of claim 1, wherein one of the reasons is availability of insufficient credit to charge for delivering the message, a first one of the service points maintaining information about the credit remaining for the terminal equipment, the first one of the service points being arranged to send the trigger signal when in said state, when the information about the credit is updated to replenish the credit, a first one of the queues being specific to messages that were not delivered due to insufficient credit.

3. The system of claim 2, wherein a further one of the reasons is unavailability of the terminal equipment in the system, a further one of the queues being specific to messages that were not delivered due to unavailability of the terminal equipment, the queuing equipment being arranged to move a content of the first one of the queues to a second one of the queues upon reception of the trigger signal from the first one of the service points when the second one of the queues is not empty upon reception of the trigger signal.

4. The system of claim 1, wherein the terminal equipment is a mobile station, the system comprising a plurality of mobile switching centers for different service areas, the switching equipment comprising at least one of the mobile switching centers and a common message source center, the common message source center containing the queuing equipment, each of the mobile switching centers being arranged to perform said consulting and to send a release instruction with a release cause specific to the at least one of the reasons that was asserted, to the common message source center.

5. The system of claim 4, wherein the common message source center is arranged to send a message delivery status message to the service point that maintains information whether the at least one of the reasons is asserted or not for the mobile station upon reception of the release instruction, the service point being arranged to assume said state in reaction to the message delivery status message.

6. The system of claim 4, wherein the mobile switching centers are arranged to perform said consulting by sending query messages to the service points, the service points being arranged to send back a release instruction with information identifying an asserted reason as release cause, the mobile switching centers being arranged to forward the release instruction to the common message source center.

7. The system of claim 1, further comprising input equipment for receiving the message, the input equipment being arranged to test whether any one of the queues in which the message may be placed is not empty, and if so to place the message into that one of the queues and if not to forward the message to the switching equipment for delivery.

8. The system of claim 1, wherein the queuing equipment is arranged to test before a retry of delivery of a message from one of the queues, whether any other one of the queues in which the message may be placed is not empty, and if so to place the message into that one of the queues and if not to retry delivery of the message.

9. A method of delivering a message to terminal equipment of a telecommunications system, the method comprising:
    receiving the message;
    consulting different service points, each to determine whether a respective reason for not delivering the message has been asserted;
    queuing the message instead of delivering the message if at least one of the reasons has been asserted, wherein the queuing step includes:
        selecting, dependent on the asserted reason, one of a plurality of queues corresponding to respective reasons for not delivering the message, each gueue storing messages that were not delivered for a respective one of the reasons or a respective combination of reasons; and
        moving the message into the selected queue;
    switching at least one of the service points that administers assertion and deassertion of the at least one of the reasons into a state in which it will send a trigger signal to the queuing equipment upon deassertion of the at least one of the reasons;
    sending the trigger signal from the service point to queuing equipment when the at least one of the reasons has been deasserted; and
    retrying delivery of messages upon reception of the trigger signal, said retrying step including delivering messages from one or more of the queues that are selected dependent on the trigger signal according to the deasserted reason.

10. A message source apparatus for use in a telecommunications system, the message source apparatus comprising:
    a transmitting section for forwarding a message to a switching center for delivery to terminal equipment;
    a receiving section for receiving back a release instruction from the switching center, the release instruction identifying which one of a plurality of possible reasons for not delivering the message has occurred if the message has not been delivered to the terminal equipment;
    queuing means for queuing messages that could not be delivered, the queuing means being arranged to maintain a plurality of logical queues corresponding to respective reasons for not delivering the message, each for queuing messages that could not be delivered for a different reason or a combination of the reasons, the queuing means being arranged to place the message in a selected one of the queues in accordance with the reason identified in the release instruction; and
    retry means for initiating a retry of delivery of the message in response to a trigger signal, the retry means being arranged to initiate a retry of delivery of the message in response to a trigger signal that is selective for the queue in which the message is queued.

11. The message source apparatus of claim 10, further comprising a status message transmission section arranged to send a status message to a service point in response to said release instruction, wherein the message transmission section selects the service point in accordance with the reason identified in the release instruction so that the service point is selected which maintains information necessary for assertion of said reason for the user equipment, the status message instructing the service point to send the trigger signal upon deassertion of the reason.

12. The message source apparatus of claim 10, wherein said reason is insufficient credit for charging for delivery of the message.

13. A service point apparatus for use in a telecommunications system, for administering credit for receiving a message queued for a plurality of pieces of terminal equipment in the system, the service point apparatus comprising:
    means for updating credit for the pieces of terminal equipment;
    a receiving section for receiving a status message identifying a message source equipment in the telecommunications system and a piece of terminal equipment; and
    a transmitting section arranged to send a trigger signal to the identified message source equipment when the credit for the identified piece of terminal equipment is updated, if the receiving section has received the status message.

14. The message source apparatus of claim 10, wherein said reason is insufficient credit for charging for delivery of the message.

* * * * *